Jan. 26, 1954

S. A. FOSTER 2,666,993

PRECISION GAUGE

Filed May 21, 1952

INVENTOR.
Shubel A. Foster
BY
Hanley Lightfoot
Attorney

Patented Jan. 26, 1954

2,666,993

UNITED STATES PATENT OFFICE 2,666,993

PRECISION GAUGE

Shubel A. Foster, Birmingham, Mich., assignor to The Foster Engineering Corporation, Royal Oak, Mich., a corporation of Michigan Application May 21, 1952, Serial No. 289,155

5 Claims. (Cl. 33—147)

This invention has reference to automatic electric work sizing gauges of the type described in my Letters Patent of the United States No. 2,267,559, granted December 23, 1941, and has for its object to provide a modified arrangement of certain parts thereof with a view to improving the stability of the device, especially under conditions of use where it may be subject to undue vibration or shock tending to effect premature operation of the device or such as may result from careless handling by an operator.

My patented work sizing gauge referred to is characterized by a tell-tale gauge block which is movable between a work dimension-responsive gap element on one side and a manually adjustable gap element on the opposite side thereof when the said dimension-responsive element moves in response to the gringing away to a determined extent of the surface being gauged; a body structure supporting the said elements and said gauge block in operative relation to one another.

In the example described in the said patent, the dimension-responsive gap element is shown as being in the form of a bell crank the lower arm of which extends more or less horizontally into operable engagement with a biased plunger the lower end of which plunger, in use, rides in gauging contact with the work; the upper arm of the said bell crank extending upwardly from its pivot and being provided with a wear-resisting projection defining the gap through which the said gauge block is to pass.

The foregoing arrangement, including the typically bell crank form of dimension-responsive gap element wherein the wear-resisting projection referred to swings in a direction substantially at right angles to the axis of movement of the gauge block works admirably under normal conditions of operation where undue forces tending to urge the gauge block between the gap elements are not present; but under certain conditions of operation it has been found that, when the spacing of the gap elements closely approaches that of the width of the gauge block, excessive shock or vibrational movement of the device has been known to cause the block to force the upper arm of the bell crank responsive element outwardly away from the other of said elements thereby permitting the said gauge block to prematurely pass between the elements and thus inaccurately indicate the completion of the grinding operation.

It is, therefore, an important object of this invention to provide in such a device a form and disposition of dimension-responsive gap element in which the forces will be distributed in a manner eliminating the possibility of the gauge block influencing the dimension of the gap between the said elements; and to provide an arrangement wherein the arc of movement of the wear-resisting projection of the dimension-responsive gap element will be in a direction nearly but not quite parallel with the axis of the movement of the gauge block, as distinguished from being substantially at right angles thereto, in order to overcome the disadvantages ascribed to the use of the bell crank form of such dimension-responsive element.

Still further objects or advantages additional or subsidiary to the aforesaid objects, or resulting from the construction or operation of the invention as it may be carried into effect, will become apparent as the said invention is hereinafter further disclosed.

Similar characters of reference indicate similar parts in the several figures of the drawing.

Figures 1, 2:
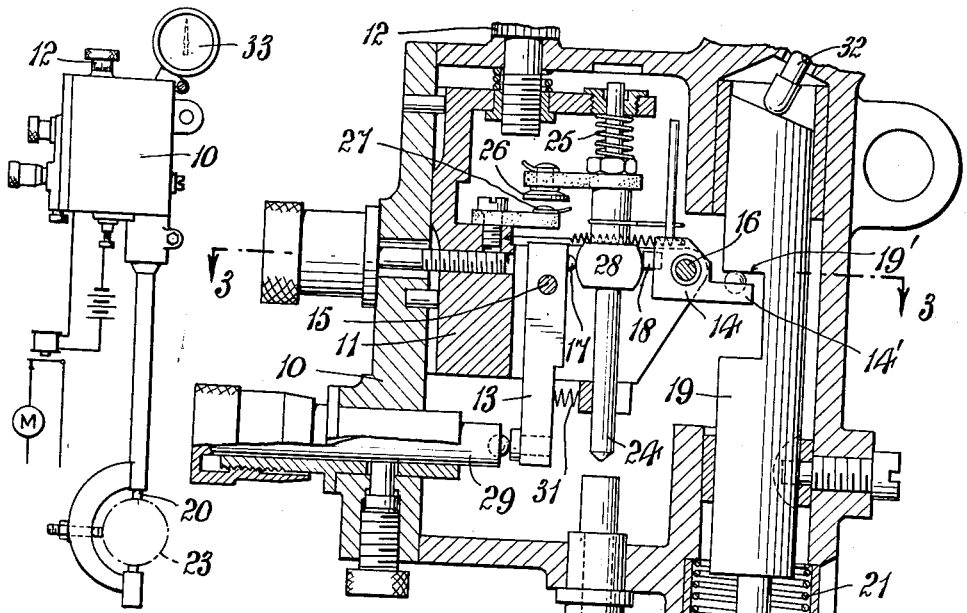
Figure 1 is an elevation of a gauge of the type referred to shown schematically as applied to work and electrically coupled to a motor for controlling the operation of the work.
Figure 2 is a vertical section of the body or casing of the gauge device showing the switch or indicator-controlling mechanism.

Numeral 10 indicates the casing of the device enclosing the carrier 11 which is vertically adjustable as by the micrometer 12, the said carrier supporting a pair of levers 13 and 14 (hereinafter termed "gap elements") which are pivoted at 15 and 16, respectively. The gap element 13 is shown as being provided with a rounded wear-resisting projection 17 while the element 14 is also provided with a wear-resisting projection 18. The pivoted elements 13 and 14 and their projections 17 and 18 respectively define an adjustable gap, the means for said adjustment being hereinafter described. The projection 18 is shown, in Fig. 4, as having a vertical face $a$ terminating at the under horizontal surface $b$.

The gap member 14 has a rearwardly extending leg 14' which (under the influence of the light spring 30) engages one of the faces 19' of a notch in a plunger 19 connected to the upper end of a gauge rod 20, which rod is biased in a downward direction by the compression spring 21 bearing upon the annular abutment 22, as shown. The lower end of said gauge rod 20 is intended, in use, to bear on the work 23 whereby it will, through the agency of the herein described mechanism, indicate the diameter to which the said work is ground.

The width of the spacing between the said projections at any moment is determined by three factors: the vertical positioning of the adjustment of the carrier 11 on which both of the gap members are mounted; the vertical position of the plunger 19 as determined by the diameter of the work engaged by the lower end of the gauge rod 20; and the angular position of the adjustment of the gap member 13 on its pivot 15 as determined by the setting of a micrometer spindle 29 which engages the elongated depending leg of said gap member 13 and urges it against the resistance of the spring 31.

24 is a reciprocal stem extending vertically between the gap elements 13 and 14 and subject to the downward pressure of the spring 25, the said stem carrying a switch contact 26 movable downwardly therewith toward a second switch contact 27 mounted on the carrier 11. The said stem 24 has secured thereon a gauge block 28 having arcuate or similarly formed surfaces presented in the direction of the wear-resisting projections 17 and 18 of the said gap elements 13 and 14; whereby downward motion of the said gauge block 28, and the consequent closing of the contact 26 on the contact 27, would be prevented by the opposed projections 17 and 18 of the members 13 and 14 unless the gap between the said projections is increased to a degree at least equal to the maximum width of the gauge block 28 presented thereto.

Figure 3:
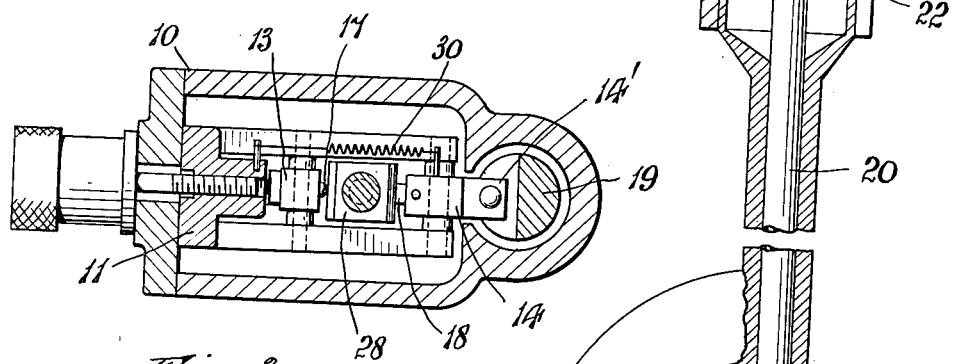
Figure 3 is a horizontal section of the same taken on a plane indicated by the line 3—3, in Figure 2.
Figure 4:
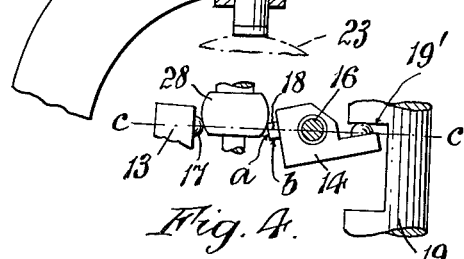
Figure 4 is a fragmentary view of a portion of Figure 2 illustrating the relative operative movements of the gauge block and the dimension-responsive element of my improved device.

In the arrangement as shown in Figures 2, 3, and 4, the gap is greater than the width of the gauge block 28 whenever the lower edge b of the projection 18 is swung upwardly above the horizontal plane passing through the centers of the projection 17 and the pivot 16, as indicated by the broken line c—c in Figure 4. Whenever this projection is swung downwardly of that plane, the said projection 18 will extend into the downward path of the block 28 as will be clearly apparent in the said Figure 4.

It will be observed that, while the present improved construction involves the general principles of my earlier patent, the action of the dimension-responsive gap element 14 differs from that of the corresponding element in the said patent in certain important particulars. The upper arm of the bell crank gap member of the said patent swung above its pivot whereby the wear-resisting and gauge block interrupting projection of that earlier gap member moved in a path substantially horizontally disposed arc in a path substantially at right angles to that travelled by the vertically movable gauge block. Consequently it was vulnerable, under circumstances of excessive vibration or shock, to movement by the said gauge block itself to the extent that the block could thus force itself between the gap elements upon occasion in a premature manner before the work had actually been ground down to the point where the mechanism should actually operate.

It will be understood that the spring 31 bearing on the gap member 13 is preferably quite strong, while the spring 30 connected with the gap member 14 is preferably very much lighter whereby it offers a minimum of resistance to the gauging movement of the plunger 19.

32 indicates the pin of a dial indicator 33 for registering the vertical position of the said plunger 19 and thereby indicating the progress of grinding or the diameter of the work 23. 34 is simply a lifter manually operable to effect the resetting of the tell-tale gauge block 28 to its upper position above the projections 17 and 18 of the gap elements prior to putting the gauge into operation on the work.

The use of a dial indicator operated by the plunger 19 is, of course, optional as it in no way affects the operation of the tell-tale gauge block 28.

As in the case of the apparatus described in my prior Letters Patent No. 2,267,559, hereinbefore referred to, the tell-tale block 28 by controlling the closing of the switch contacts 26 and 27 may serve to control a machine or parts of a machine or apparatus, either for starting or stopping, or to initiate any operation or stop any operation when the work 23 has been reduced to a desired dimension, which dimension may be determined with very great accuracy due to the high sensitivity of the control of the gap members 13 and 14 over the passage of the gauge block 28. The said switch contacts 26 and 27 may simply serve to control an indicator such as a light or buzzer to warn of the completion of the grinding or other operation.

Herein and in the claims, the block 28 is referred to as a "tell-tale" inasmuch as its operation is intended to indicate, either directly or indirectly according to its mode of observation, the accomplishment of a certain desired gauging function. It will also be understood that the terms "vertical" and "horizontal" are relative and used in the sense that it is assumed that the device is viewed with the plunger 19 in a vertical position.

This invention may be developed within the scope of the following claims without departing from the essential features of the said invention and it is desired that the specification and drawing be read as being merely illustrative of a practical embodiment of the said invention and not in a strictly limiting sense.

What I claim is:

1. In a device of the class described, in combination, a size-responsive work-gauging plunger, a pivoted work dimension-responsive gap element operable by said plunger, said element having a gap-defining projection thereon, a manually adjustable pivoted gap element, also having a gap-defining projection thereon, a tell-tale gauge block movable in a fixed path between said elements whenever said work-gauging plunger moves said dimension-responsive gap element to increase the gap between said elements to a determined extent, and a body structure supporting said elements and said gauge block in operative relation one to the other, the pivot of said dimension-responsive gap element being positioned whereby that end of the element determining the gap swings in a limited arc intercepting the path of movement of said gauge block, the chord of said block being substantially parallel to the path of said gauge block, and the working face of the projection of said dimension-responsive gap element being substantially vertical in the position wherein said gauge block is released for passage through the gap, the lower edge of said working face then being in substantial alignment with the pivot of said dimension-responsive gap element and with the gap defining projection of said manually adjustable element.

2. In a device of the class described, in combination, a body frame structure, a size-responsive work-gauging plunger reciprocable therein, a work dimension-responsive gap element pivotally supported by said frame and operable by said plunger, a manually adjustable gap element pivotally supported on said frame in spaced relation to said first gap element, a tell-tale gauge block supported on said frame and movable in a fixed path between said elements whenever said work-gauging plunger moves said dimension-responsive gap element to increase the gap between said elements to a predetermined extent, said work dimension-responsive gap element having a defined pressure point adjacent said gauge block, the pivotal axis of said work dimension-responsive gap element being substantially in alignment with said pressure point in a line normal to the path of movement of said gauge block when the major transverse dimension of said gauge block is above said line, whereby transverse force components exerted by said gauge block as a result of excessive shock or vibration will be resisted by the pivotal axis of said work dimension-responsive gap element.

3. In a device of the class described, in combination, a reciprocal size-responsive work gauging plunger, a manually adjustable pivoted gap element adjacent said plunger, pivoted work dimension-responsive gap element having its longitudinal axis normally disposed at right angles to the longitudinal axis of said plunger and having its outer end operably engageable with said plunger and its inner gap defining end adjacent said first gap element and movable in a limited arc, the chord of said arc being substantially parallel to the longitudinal axis of said plunger, a tell-tale gauge block movable in a fixed path between said elements and parallel to said plunger, said arc of movement intercepting the path of the tell-tale gauge block, and a body structure supporting said elements and said gauge block in operative relation one to the other.

4. A device as set forth in claim 3, further including means responsive to the movement of said gauge block to indicate its passage between said gap elements.

5. In a device of the class described, in combination, a tell-tale gauge block movable in a fixed path, adjustably spaced gap elements normally interrupting the movement of said block therebetween, one of said gap elements having its longitudinal axis normally disposed substantially at right angles to the path of said gauge block and being pivotally mounted for limited movement of its block interrupting end in an arcuate path which intercepts the path of movement of said gauge block, the chord of the arc being substantially parallel to the path of said gauge block, a reciprocable work gauging member operatively connected to the outer end of said pivoted gap element, means for manually adjusting the pivotal axis of said pivoted gap element in a direction parallel to the longitudinal axis of the work gauging member to thereby vary the capacity of the gauge, means for moving the other gap element towards and from said pivoted gap element to vary the initial spacing of said gap elements, and a body structure supporting said gauge block, variable gap elements and said plunger in operative relation one to the other

SHUBEL A. FOSTER.

References Cited in the file of this patent

UNITED STATES PATENTS

| Number | Name | Date |
|---|---|---|
| 2,267,559 | Foster | Dec. 23, 1941 |